July 27, 1937.  R. W. CALDWELL  2,088,363

STEREOSCOPE

Filed Sept. 21, 1934  2 Sheets-Sheet 1

INVENTOR.
ROBERT W. CALDWELL
BY
Kwis Hudson & Kent
ATTORNEYS

July 27, 1937.  R. W. CALDWELL  2,088,363
STEREOSCOPE
Filed Sept. 21, 1934  2 Sheets-Sheet 2
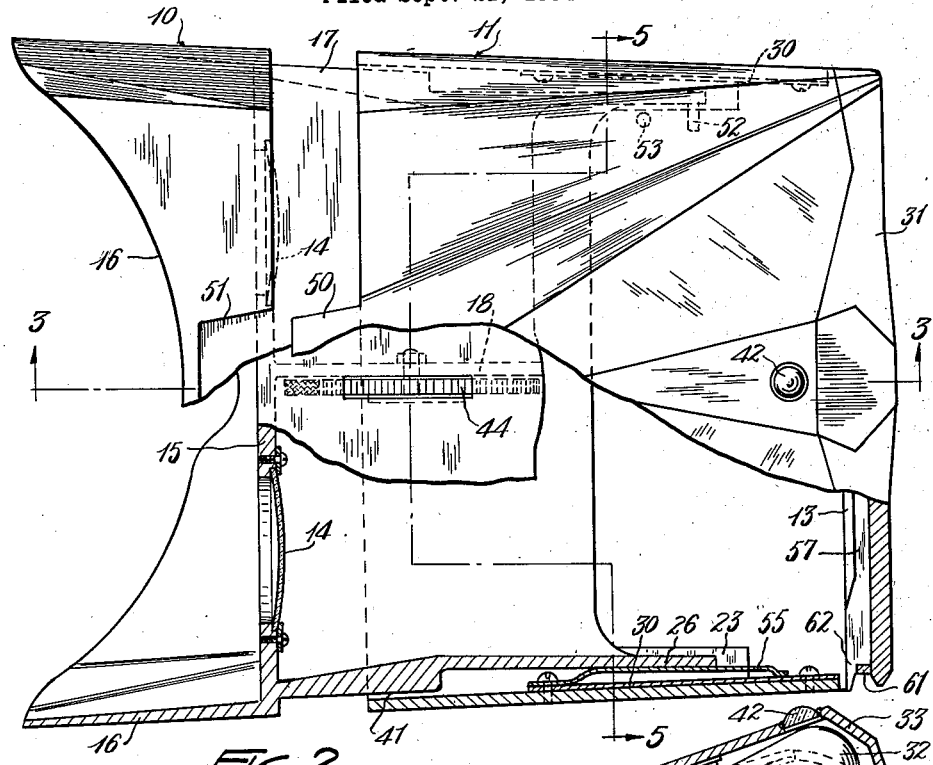
INVENTOR.
ROBERT W. CALDWELL
BY
ATTORNEYS Patented July 27, 1937

2,088,363

UNITED STATES PATENT OFFICE 2,088,363

STEREOSCOPE

Robert W. Caldwell, Cleveland, Ohio

Application September 21, 1934, Serial No. 744,967

2 Claims. (Cl. 88—29)

This invention relates to devices for observing views with third dimensional effects, commonly known as stereoscopes and, more particularly, to an improved device of this kind.

An object of the present invention is to provide a stereoscope of improved construction having a casing comprising telescopically slidable tubular members, one of which constitutes a view holder and the other of which constitutes a lens holder.

Another object of this invention is to provide a stereoscope having a substantially closed casing with means for supporting a view therein and means in the casing for illuminating the view.

Still another object of the invention is to provide an improved stereoscope of compact and attractive form having a casing formed of telescopically slidable members and wherein novel means is provided for relatively adjusting said members.

A further object of the invention is to provide a stereoscope having a casing of substantially tubular form with a view holder at one end of the casing and with a lamp mounted in the casing out of the direct line of vision for supplying illumination to the view.

It is also an object of this invention to provide an improved stereoscope having a slide holder and provided with novel means for controlling the insertion and removal of slides.

Other objects and advantages of the invention will be apparent from the following description when taken in conjunction with the accompanying sheets of drawings, wherein—

Fig. 2 is a similar plan view thereof, but on a larger scale and with portions of the device broken away;

Fig. 3 is a longitudinal sectional view of the device taken on line 3—3 of Fig. 2;

Fig. 4 is a partial side elevation of the device showing the slide opening;

Figure 5:
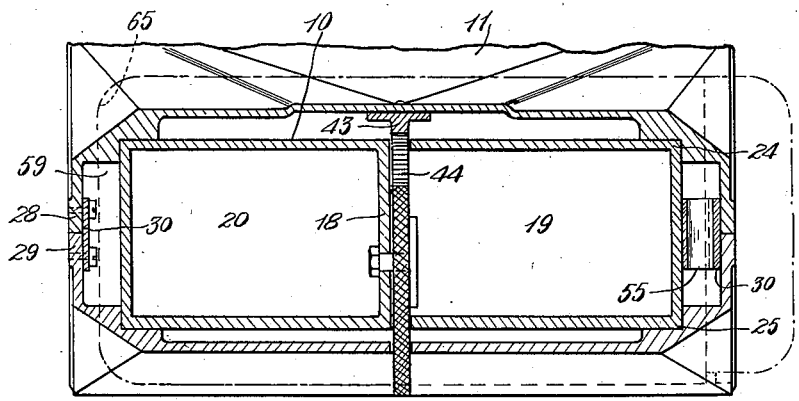
Fig. 5 is a transverse sectional view taken on line 5—5 of Fig. 2.

In the accompanying drawings to which detailed reference will presently be made, I have shown what I now regard to be a practical form of the improved stereoscope of my invention. It will be understood, of course, that the accompanying drawings are for purposes of illustration and that the invention may be embodied in various constructions and arrangements other than those herein illustrated.

It will be seen from the drawings that the improved stereoscope of my invention is in the nature of a compact self-contained device which has a pleasing and attractive appearance making the device especially suitable for use in homes, schools, and the like. In general my invention provides for an improved stereoscope having a substantially closed casing formed of telescoping tubular parts, and means within the casing for illuminating the stereoscopic view or slide.

The casing of the device is composed of telescopically slidable tubular sections 10 and 11, one of which provides a support for a stereoscopic view and the other of which constitutes a holder for a pair of stereoscopic lenses. In this instance the section 11, which is the outer casing section, provides the view holder, and the section 10, which is slidable in the section 11, constitutes the lens holder.

The telescoping sections forming the casing of my improved stereoscope may be constructed from any suitable material such as metal, bakelite, fiber, or the like, and they may be produced by any suitable manufacturing apparatus or process. For example, the casing sections may be produced by the casting or molding of material to the desired shapes.

As will be seen from the drawings, the sections 10 and 11 form a substantially tubular casing at one end of which a stereoscopic view, such as a substantially opaque slide, may be supported by the holder 13 to be observed through a pair of stereoscopic lenses 14. These lenses may be suitably mounted in openings provided in the transverse wall 15 of the casing section 10. The holder 13, as will be explained more fully hereinafter, forms the outer end wall for the tubular casing and the wall 15 forms the opposite end wall.

The casing section 10, which, as stated above, constitutes the lens holder, is constructed with a hood portion 16 which extends rearwardly from the transverse wall 15 and which is of suitable shape to comfortably fit over and around the eyes of a person using the device. The casing section 10 also has a tubular portion 17 which extends forwardly from the transverse wall 15 and telescopes into the casing section 11. The tubular portion 17 is provided with a vertical division plate 18, which may be formed integral with this part of the device, and which divides the interior of the tubular portion into two longitudinally extending barrels 19 and 20. As is usual in devices of this kind, the division plate 18 is disposed between the lenses so that the right and left hand parts of the stereoscopic slide must be viewed, respectively, through the right and left hand barrels and lenses.

The casing section 11 is constructed with a pair of guideways 22 and 23 at each side thereof in which the corners 24 and 25 of the casing section 10 are slidable. The tubular portion 17 of the casing section 10, operating in the guideways 22 and 23, permits telescopic adjustment of the casing sections for focusing the lenses with respect to the view holder, and maintains the casing sections in proper alignment for all positions of adjustment thereof. It will be understood, of course, that the casing section 11 and the tubular portion 17 of the casing section 10 may be made of any suitable length which will make possible any adjustment which is necessary or desirable to properly view the stereoscopic slide, and to provide the proper cooperation for retaining the casing sections in proper alignment with each other. If desired, the tubular portion 17 of the casing section 10 may be provided with extensions 26 at the sides thereof, which operate in the ways 22 and 23 and increase the effective bearing area between the casing sections for maintaining the latter in proper alignment.

The casing section 11 may be constructed as a single part, or, as shown in this instance, may be made up of several parts such as the top and bottom parts 28 and 29 which are held together by connecting plates 30, and the cover part 31 which contains the view holder 13 and forms the outer end wall of the casing. The section 11 is preferably of tapering form, as shown in the drawings, so that its open inner end may be only large enough to accommodate the tubular part 17 while its outer end will be large enough to accommodate a stereoscopic slide.

As stated above, the sections 10 and 11 form a substantially closed casing and, according to an important feature of my invention, I provide a source of illumination within the casing which supplies the light required for viewing the substantially opaque stereoscopic slide. Any suitable lamp or light producing device may be used as the source of light and, in this instance, I show a small incandescent lamp 32 arranged in the casing for supplying light to the stereoscopic view. The lamp should be arranged in such a position that it will be outside of the field of vision of an observer looking into the casing through the lenses 14.

In the present form of my improved device the top wall of the casing section 11 is cut away to accommodate the lamp 32 so that the latter may be arranged above the direct line of vision of the observer. In this instance the cover part 31 is formed with a hollow extension 33 having a pocket 34 communicating with the interior of the casing. The hollow extension 33 overlies the recess of the top wall and the lamp 32 is supported in the pocket by a suitable socket fixture 35. With the lamp in this position, as shown in Fig. 3, light will be thrown down into the casing and efficient illumination will be supplied to the stereoscopic view without having light from the lamp shine directly into the eyes of the observer. Current for operating the lamp may be supplied through an extension cord 36 which has proper connections with the socket fixture 35. It will be seen from the arrangement just described that the view of the substantially opaque stereoscopic slide is made visible by reason of the reflection of light from the slide.

The cover part 31, which contains the view holder 13 and supports the lamp 32, may be secured to the casing 11 in any suitable way, but should preferably be removable so that the lamp may be readily replaced whenever this becomes necessary or desirable. A connection of this nature between the cover part and the casing section 11 may be formed by providing the cover part with a hinge pin or lug 37 which engages in an opening in the top wall of the casing section, and a spring latch 38 at the lower edge of the cover part. The spring latch 38 may be suitably secured to the cover part and is bent to provide a locking projection 39 which engages in an opening 40 of the bottom wall of the casing section 11 when the cover part is fitted into proper cooperating relation with the outer end of this casing section. The spring latch 38 may be released by simply inserting a nail or other pointed instrument through the opening 40.

Since the light for illuminating the stereoscopic view is furnished by a light source contained in the casing, it will be understood to be of importance that the casing sections 10 and 11 cooperate in a manner to minimize the leakage of light into or out of the casing. To this end the cross-sectional shape of the open end of the casing section 11, and the cross-sectional shape of the portion of the tubular part 17 of the casing section 11 which operates in this open end, will have relatively close interfitting relation as indicated at 41 in Fig. 2. It may also be desirable to provide means for indicating, exteriorly of the casing, whether or not the incandescent lamp 32 is lighted. Such indicating means may be in the form of a small opening or lens 42 provided in the casing above the lamp. Light shining through such opening or lens will indicate whether or not the lamp is lighted.

As another feature of my invention, I provide novel means for relatively adjusting the casing sections 10 and 11 to properly focus the lenses with respect to the stereoscopic view being observed. This adjusting means comprises cooperating gear members on the respective casing sections with means accessible from the exterior of the device for operating one of the gear members. In this instance, these cooperating gear members are in the form of a rack 43 and a pinion 44.

The rack 43 is mounted on the top wall of the casing section 11, adjacent the partition plate 18 of the casing section 10, and may be secured to the top wall by suitable screws or rivets 45. The pinion 44 is in the form of a disk wheel which is pivotally supported on the partition plate 18. The teeth of the pinion are formed in the edge of the disk wheel and preferably extend only for a portion of the circumference of the wheel, as shown in Fig. 3. The disk wheel of the pinion is constructed of a diameter such that when the toothed section thereof cooperates with the rack 43 a segment of the remaining portion of the wheel will project outside of the casing through the slots 46 and 47 provided in the casing sections. A similar slot 48 formed in the top wall of the tubular portion 17 of the casing section 10 accommodates the top portion of the pinion wheel so that the teeth thereof may mesh with the rack 43.

From the arrangement just described it will be seen that a portion of the pinion wheel is accessible from the exterior of the casing, and that the operator can rotate the pinion on its pivot to cause the casing sections to move relatively to each other and thereby change the adjustment of the lenses with respect to the view holder. To facilitate actuation of the pinion wheel by the thumb or fingers of the operator, the untoothed section of the periphery of the wheel may be knurled, as indicated in Fig. 5.

To conceal the rack 43 and to prevent the passage of light through the slot 48, the top wall of the casing section 11 may be constructed with an overlying extension 50. The hood of the casing section 10 may be provided with a similarly shaped recess 51 which accommodates the extension 50 when the device is in the collapsed condition.

Complete separation of the casing sections may be prevented if desired by providing suitable stops and, in Figs. 2 and 3 of the drawings, I have shown a pair of cooperating stops for this purpose. These stops may be suitably formed lugs on the casing sections, or, as shown in the drawings, may be in the form of pins 52 and 53 which are carried respectively by the casing sections 10 and 11 and which have intersecting paths of movement.

To prevent rattling and excessive lost motion between the casing sections it may be desirable to provide a spring 55, or other equivalent means, for relatively biasing the casing sections in a direction transversely of their common axis. The spring 55 is here shown as being secured to the casing section 11 and bearing against one of the side walls of the tubular portion 17 of the casing section 10. This spring also serves to provide sufficient friction between the casing sections to maintain the latter in a desired position of adjustment which has been established by actuation of the pinion 44.

Figure 6:
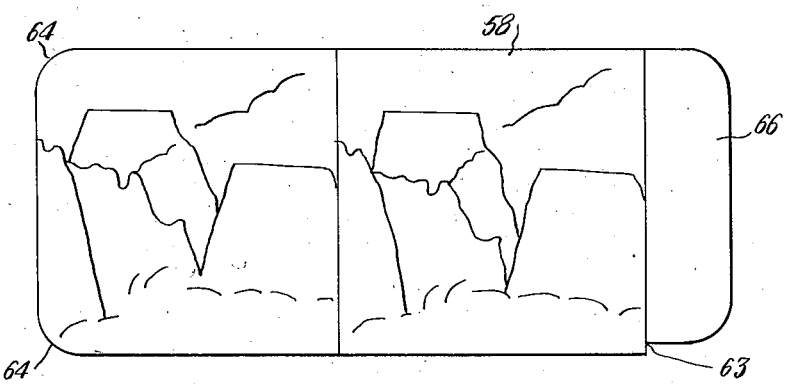
Fig. 6 is a plan view of a stereoscopic slide for use in the device.

The view holder 13, which is provided on the cover part 31, may comprise simply a pair of spaced grooves 56 and 57 which receive opposite edges of a slide such as the slide 58 shown in Fig. 6. At their inner end, or in other words at the left hand side of the casing, the top and bottom grooves 56 and 57 may be connected by a vertical groove 59. The outer ends of the grooves 56 and 57 communicate with a slot 60, which is provided at the right-hand side of the casing as shown in Fig. 4, for the insertion and removal of the slides.

As a further feature of my invention, I provide means for controlling the insertion and removal of slides through the opening 60 so that a collection of slides may be retained in the view holder 13 in such a way that slides can be removed singly in succession after being viewed, and so that only slides of proper characteristics will be usable in the stereoscope. This control means includes a lug or stop 61 which extends into the opening 60, as shown in Figs. 2 and 4, and controls the direct insertion or removal of slides through the opening. The lug 61 is located in line with the bottom groove 57 so that it may serve as a retaining means which prevents slides from dropping out of the holder. A recess 62 formed at one side of the lug 61 communicates with the opening 60 and with the groove 57 so that by slightly tilting the slide or deflecting the lower edge thereof the slide may be caused to pass the lug 61 and thus be removed through the opening 60.

The slides to be used with the device may be formed with a recess or notch 63, as shown in Fig. 6, which recess will accommodate the lug 61 when the slide has been inserted into the view holder the correct distance. If the slide has not been inserted into the holder far enough the recess 63 will not register with the lug 61 and the slide cannot be shifted into correct position in the grooves of the holder.

The slide should be of such size that its width will be slightly less than the height of the slot 60 as measured between the top of the lug 61 and the top of the slot so that slides can be directly inserted, either singly or in a group, through the slot and over the lug. When the slides have been inserted for the full distance and are allowed to drop in the holder grooves, the recess 63 receives the lug 61. The slides are then in correct position in the holder and are retained against direct removal by the lug.

As shown in Fig. 6 the inner end of the slide may be provided with rounded corners 64 which correspond in shape with similarly rounded corners 65 provided at the inner ends of the grooves 56 and 57 of the view holder. The slide 58 is constructed with the recess 63 located from the rounded inner corners 64 a distance corresponding with the spacing of the lug 61 from the rounded corners 65. Hence it will be seen that slides of proper size and shape can be directly inserted through the opening 60 but that slides which are not of the proper size or shape cannot be so inserted. The lug 61 will prevent the slides from dropping out of the device should the latter be tilted by the observer and thus also provides a means whereby a number of slides may be arranged in the view holder to be observed in succession without danger of such slides dropping out of the device.

As shown in Fig. 6 the slide 58 may be provided at the right hand end thereof with a suitable tab or extension 66 which may be grasped by the operator for the purpose of inserting or removing the slide.

Figures 1, 7:
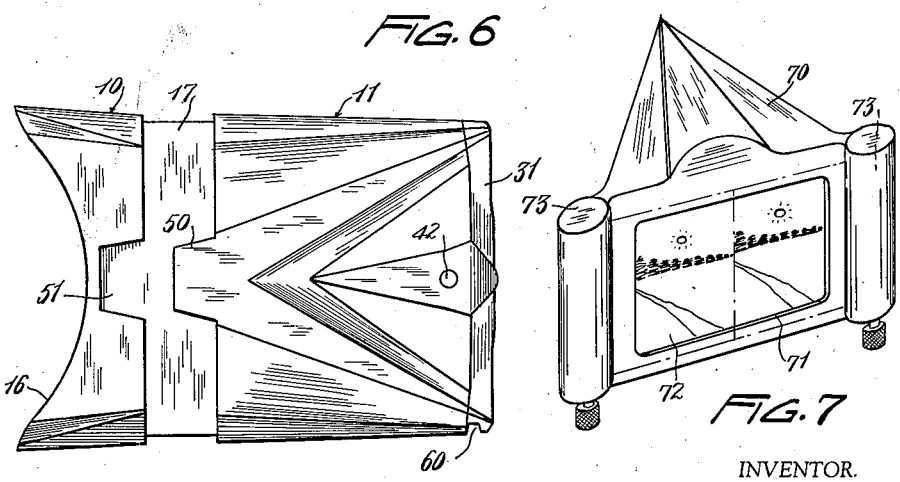
Fig. 1 is an outside plan view of a stereoscope constructed according to my invention.
Fig. 7 is a perspective view of an adapter cover for use with transparent stereographs.

In some instances it may be desirable to use transparent stereographs with my improved device, such as films or glass slides to be viewed with the aid of direct light from an external source, and to adapt the present device to such use I have provided the cover 70 shown in Fig. 7 which may be substituted for the cover 31. The cover 70 has the same general shape as the cover 31 but, instead of having a lamp such as the lamp 32, it has a light admitting opening 71 over which the transparent stereograph may be disposed.

As mentioned above the transparent stereograph may be a film, and in Fig. 7 I show a film 72 extending across the opening 71. The film may be arranged on suitable rollers 73 supported at the sides of the cover so that the various views may be observed by winding the film from one roller to the other.

From the foregoing description and accompanying drawings, it will now be readily understood that I have provided an improved stereoscope of efficient, compact and attractive construction having a casing of substantially tubular shape formed of telescoping casing sections. It will also be understood that my invention provides for an improved stereoscope having a substantially closed casing with a source of light contained therein for illuminating the stereoscopic view. It will be understood moreover that my invention provides novel means for adjusting the focus of the device and novel means for controlling the insertion and removal of the stereoscopic slides.

While I have illustrated and described the improved device of my invention in a detailed manner, it should be understood, however, that I do not wish to be limited to the precise details of construction and arrangement of parts illustrated and described, but regard my invention as including such changes and modifications as do not involve a departure from the spirit of the invention and the scope of the appended claims.

Having thus described my invention, I claim:

1. In a stereoscope, a casing comprising a pair of telescopically slidable tubular members one having a view holder thereon and the other having a pair of stereoscopic lenses for observing a view carried by the holder, said other member having a division part between said lenses, a wheel rotatably mounted on said division part, and a rack on said one member, said wheel having a gear section cooperating with said rack and an actuating part extending outwardly of said casing.

2. In a stereoscope, the combination of an elongated hollow casing, a cover for one end of said casing having grooves to receive a slide and a slot at one side of the casing to insert the slide, a lamp mounted on the inner side of said cover for illuminating said view, lenses at the other end of said casing for observing said slide, means for adjusting the distance between said lenses and said cover, and means for detachably connecting said cover to said casing.

ROBERT W. CALDWELL.